Figure 1:
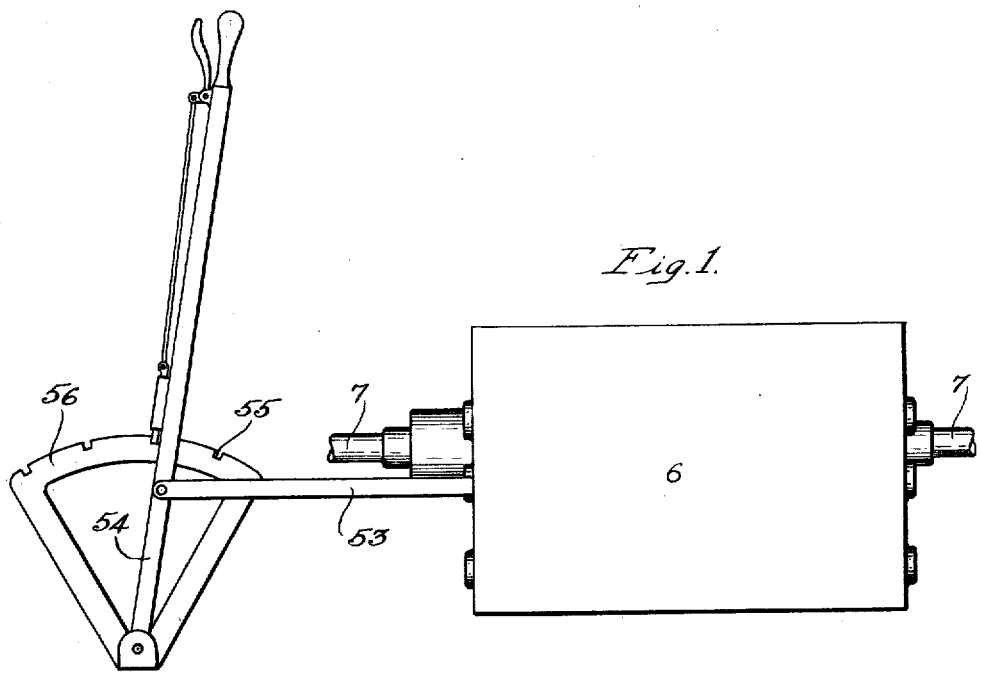

R. MILNE.
CHANGE SPEED MECHANISM.
APPLICATION FILED JUNE 29, 1911.

1,012,408.

Patented Dec. 19, 1911.
6 SHEETS—SHEET 1.

Witnesses:
Ephraim Banning.
Wm P Bond

Inventor:
Robert Milne.
By Banning & Banning
Attorneys.

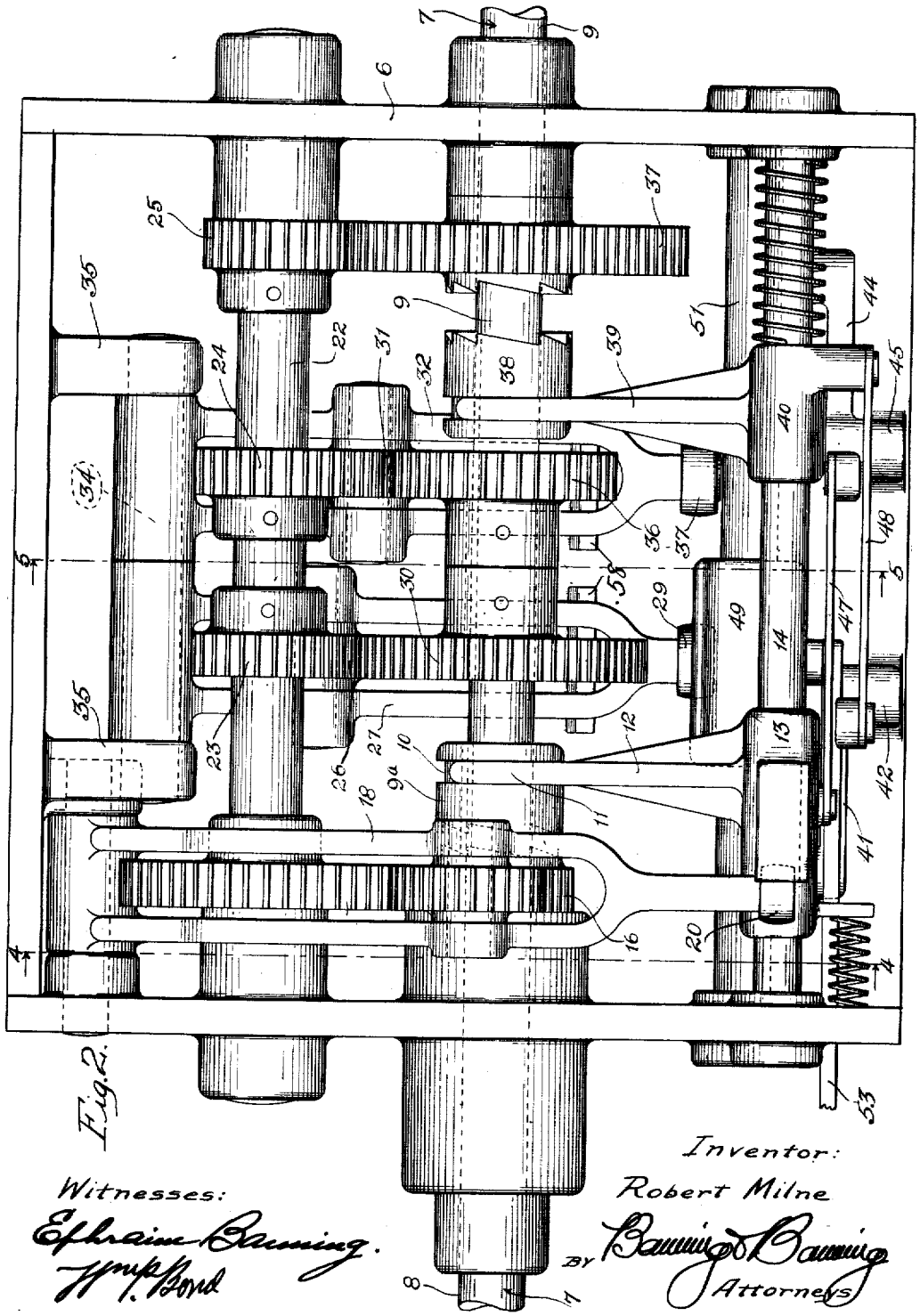

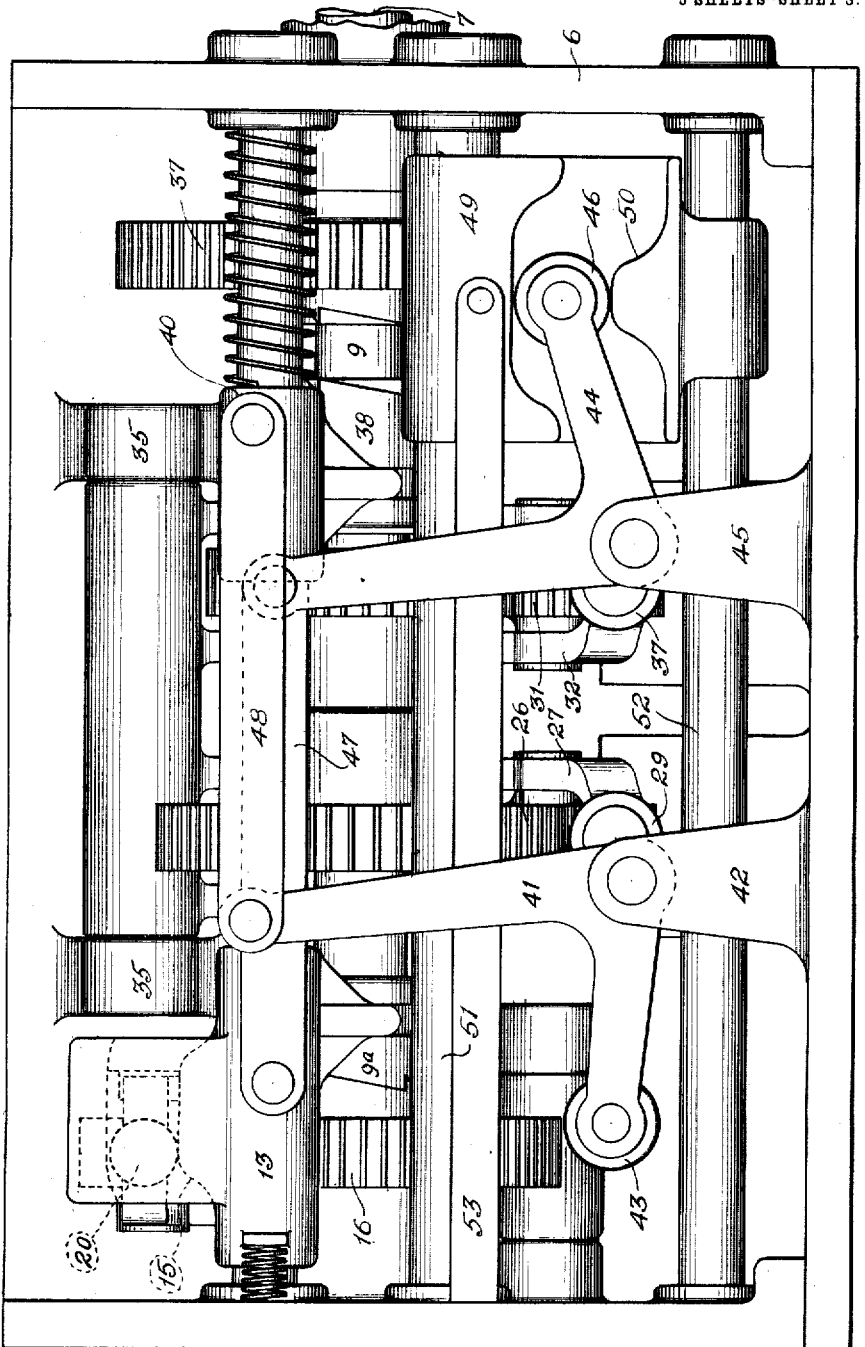

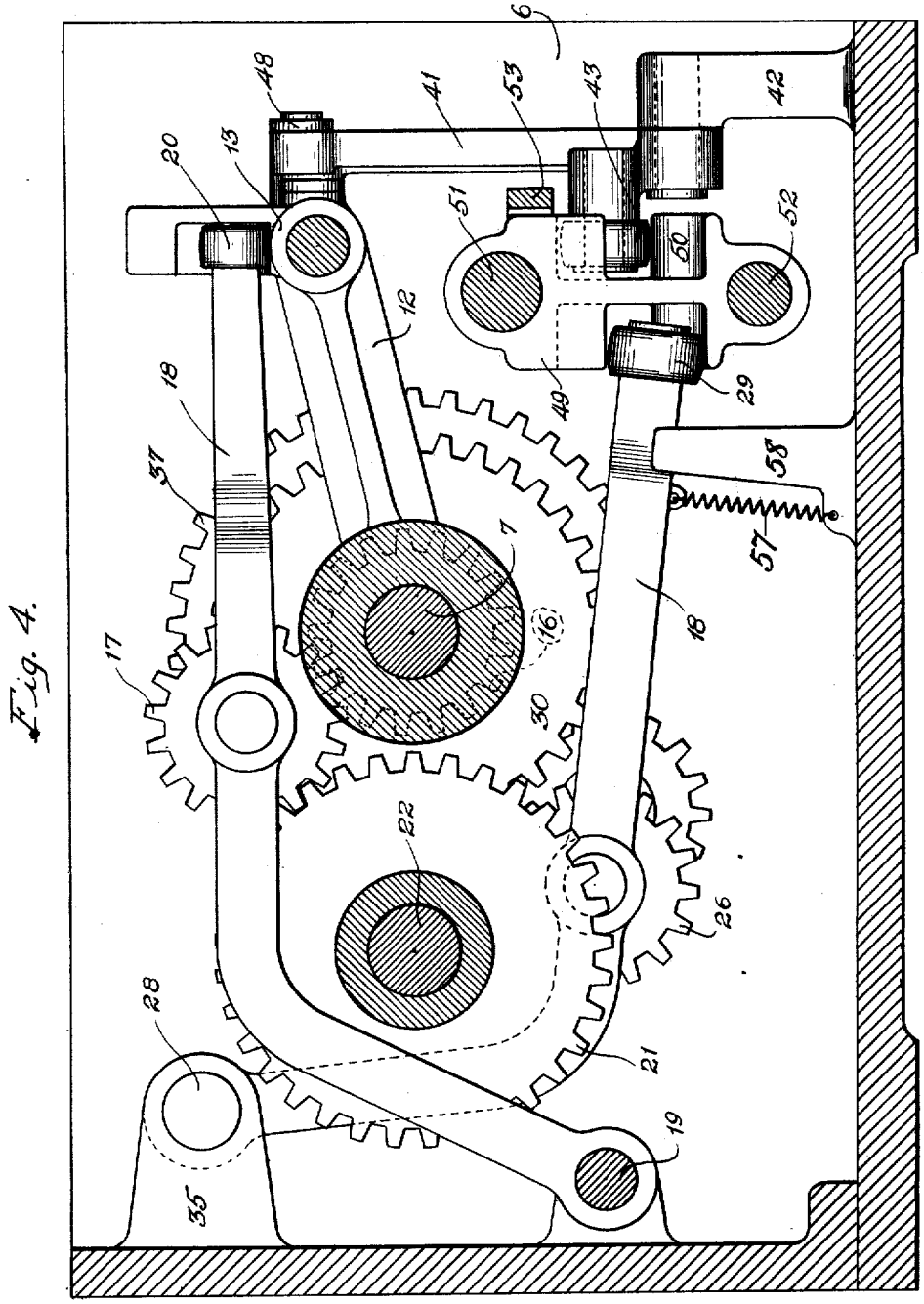

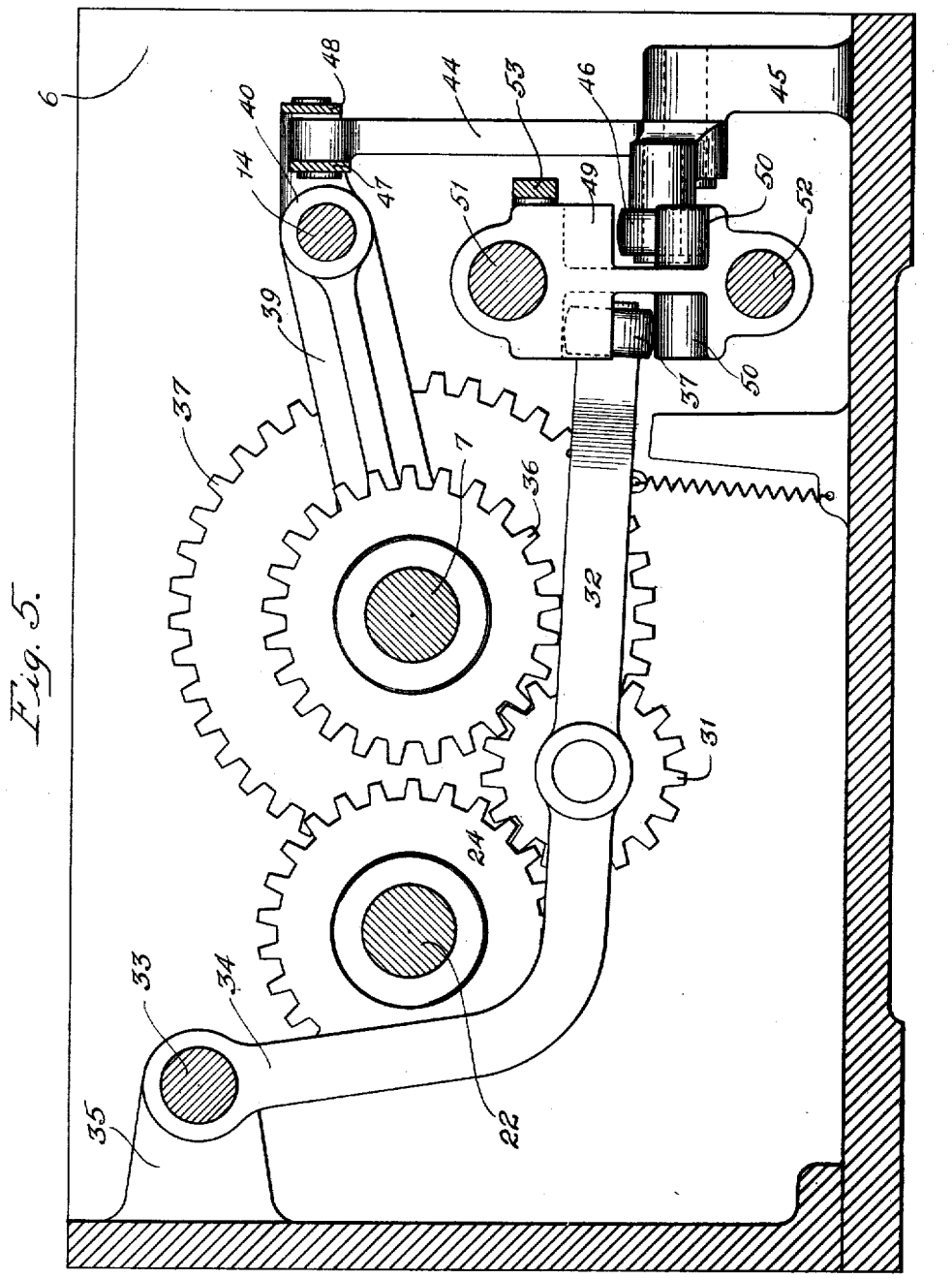

UNITED STATES PATENT OFFICE.

ROBERT MILNE, OF ROCKFORD, ILLINOIS.

CHANGE-SPEED MECHANISM.

1,012,408.  Specification of Letters Patent.  Patented Dec. 19, 1911.

Application filed June 29, 1911. Serial No. 636,039.

*To all whom it may concern:*

Be it known that I, ROBERT MILNE, a citizen of the United States, residing at Rockford, in the county of Winnebago and State of Illinois, have invented certain new and useful Improvements in Change - Speed Mechanism, of which the following is a specification.

The present invention relates to a mechanism adapted to produce a variety of speed ratios between a driving and a driven member, and to produce a direct and reverse drive of the driven member.

One of the objects of the present invention is to provide a gear connection between the driving shaft and a supplemental shaft which will include a shiftable intermediate gear, a gear connection between a driven shaft and the supplemental shaft, which will include a shiftable intermediate gear, such connection enabling a change speed ratio to be maintained between the driven shaft and the supplemental shaft, which will give a reverse drive to the driven shaft, and to so arrange these gears that all of them will be held against sliding movement.

A further object of the invention is to arrange these geared connections so that all of the shiftable gears may be thrown in or out by the actuation of a single shiftable member.

A further object of the invention is to provide means for locking the driving and driven shafts together, and to simultaneously break the connection between the driving shaft and the supplemental shaft when such locking is made, this locking action producing a direct drive.

A further object of the invention is to arrange all of the shiftable gears so that they are swung in on the periphery of the gears with which they mesh, thus eliminating any sliding movement of the shiftable gears.

A further object of the invention is to arrange the operative parts in compact relation to one another, and to inclose them within a casing, whereby they may, if desired, be run in oil, thus rendering their movements practically noiseless.

A further object of the invention is to provide a rectilinearly moving shiftable member for disengaging and engaging the intermediate gears, and to connect this shiftable member with a rocking lever in a manner whereby no lost motion results in converting the rocking movement of the lever into the rectilinear movement of the shiftable member.

A further object of the invention is in the provision of a shoe provided with a cammed surface which engages with contacts on the mounting for the shiftable gears, and to provide means for guiding said shoe in its movement within the casing inclosing the change speed mechanism.

A further object of the invention is to so arrange the various parts that it is impossible to impart two or more different types of movement to the driven shaft at the same time.

A further object of the invention is to so arrange the parts that the shiftable member operating them may be actuated by a lever having a true back and forth movement.

A further object of the invention is to arrange all of the shiftable gears so that they may be returned to normal position by gravity if desired.

A further object of the invention is to arrange the mechanism in a compact form so that it will occupy but a small space.

The invention further consists in the features of construction and the combination of parts hereinafter described and claimed.

Figure 6:
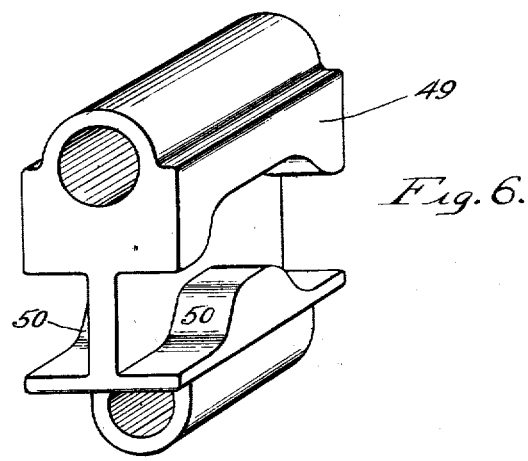

In the drawings, Figure 1 is a diagrammatic view showing an arrangement of levers for operating the change speed mechanism of the present invention; Fig. 2, a plan view of the mechanism of the present invention; Fig. 3, a front view; Fig. 4, a section on line 4—4 of Fig. 2, looking in the direction of the arrow; Fig. 5, a section on line 5—5 of Fig. 2, looking in the direction of the arrow; and Fig. 6, a perspective of the shiftable shoe.

In the art to which the present invention relates it has been customary to throw the shiftable gears of a change speed mechanism into mesh with a sliding movement, rather than with a swinging movement. In operating the gears with a sliding movement, it has been found necessary, in order to prevent a stripping of the gears during the changing, to provide some form of locking or stop device to prevent the intermeshing of two gears at the same time, and to prevent the starting of the machinery when only a partial meshing of the gears has been effected. Moreover, it has been found by practice that a greater clashing results from the throwing of the gears when thrown with a sliding movement than when thrown with a swinging movement, such a clashing naturally resulting in a substantial wear and tear on the mechanism.

It is further considered essential in this class of machinery, to employ but one member for effecting all of the shifting operations of the gears or locking devices. This is in order that the user may avoid the danger of throwing in one set of gears while another set is still in mesh, which obviously would result in two different kinds of movement being imparted to the drive shaft at the same time, which would result in a breakage at some point. It is further desirable in mechanisms of this kind, to provide means for accomplishing three operations: First, to effect a direct drive to the driven member; second, to produce various speed ratios between the driving shaft and the driven shaft; and third, to effect a reverse drive to the driven shaft. And it is deemed more desirable in shifting from direct to reverse drive to impart the variable speeds of the intermediate gears to the driving shaft so that the change of the speeds is gradual and no abrupt shock given the driving shaft.

All of the above enumerated difficulties, the present invention is intended to eliminate, and it is intended to operate so as to accomplish all of the foregoing results in a quick and efficient manner, and by the use of a simple mechanism, which is strong and simple of construction, so that it cannot be easily mutilated or broken, whereby its effectiveness would be impaired.

The device, as shown, is housed within a casing 6 of any suitable form and design, which is so arranged that it may be taken apart for the purpose of installing the mechanism or effecting any repairs or changes desired, and is of a construction, preferably, so that it may, if desired, contain a body of oil which the mechanism will run in, thus rendering its movements practically noiseless. The device employs a shaft 7, which is split at any suitable point upon its length to divide the shaft into two sections, one of which may be termed the driving shaft, and is designated in the drawings by the numeral 8. The other section may be termed the driven shaft, and is designated in the drawings by the numeral 9. A union between these two shafts may be effected by employing a suitable clutch member 9ᵃ, which, in the form shown, is of the variety known as the sliding clutch, and, as shown, is keyed or otherwise suitably secured to the driven shaft. This clutch is provided with a suitable groove 10, into which is entered the yoked end 11 of an arm 12, which is secured to a suitable sleeve-like member 13 mounted upon a fixed guide rod 14, held in the walls of the casing; and the sleeve-like member 13 is provided, on its upper surface, with a cam-trackway 15.

Keyed, or otherwise secured, to the driving shaft is a gear 16, best shown, perhaps, in Fig. 4; and meshing with the gear 16 is a shiftable gear 17, which is mounted between the arms of a yoke member 18, pivoted at 19, and said yoke member terminates in a suitable contact 20, which, in the form shown, is an ordinary roller. The gear 17 meshes with a gear 21, which is keyed, or otherwise secured, to a shaft 22, which may be termed a supplemental or transmission shaft. As will be seen from the drawings, this supplemental shaft is mounted within the walls of the casing and is extending approximately parallel to the driving shaft, although spaced away therefrom. The connection formed by the gears 16, 17 and 21 is what may be termed a driving connection between the driving shaft and the supplemental shaft. It is through the medium of this connection that power is applied from the driving shaft to the supplemental shaft, and when this connection is broken, the supplemental shaft, so far as effecting the movements of the driven shaft is concerned, becomes inoperative.

As heretofore stated, the sliding sleeve-like member 13 carries the yoke which operates the clutch 9ᵃ, and this sleeve-like member is provided with a cammed surface, which is adapted to engage the contact on the yoke member 18 and swing said yoke member about its pivot, and thus swinging the gear 17, so that a movement to operate the clutch to break the connection between the driving and driven shafts at the same movement places in mesh the gear 17 with the gear 16 and makes the gear connection between the driving shaft and the supplemental shaft; but when the clutch is thrown to lock the driving and driven shafts together, the cammed surface 15 operates to raise the yoke 18, lifting the gear 17 out of mesh with the gear 16 and breaking the gear connection between the driving and supplemental shafts, and operating the driven shaft by a direct drive from the drive shaft.

By effecting both of the above mentioned movements with the same operation, there is no possibility of the driving and driven shafts being connected while power is being applied to the supplemental shaft. This is an important point, for when the driving and driven shafts are connected, there is then a direct drive from the driving shaft through the driven shaft, and if the supplemental shaft were also being driven, there would be a secondary driving action imparted to a rotatable shaft, which, obviously, would reduce the power imparted to the driven member by the driving shaft.

Located upon the supplemental shaft 22 are a series of gears 23, 24 and 25. The gears 23 and 24 are shown probably more clearly in Fig. 2, and, as will be seen, are of different sizes. These gears constitute portions of a series of change speed geared connections between the supplemental shaft and the driven shaft, and it is to be understood that although there are only two sets of change speed geared connections shown, there may be as many utilized as is deemed expedient in the class of machine with which the change speed mechanism is being used.

The gear 23 meshes with a gear 26, which is mounted within a yoke member 27, which is pivoted at 28, the end of the yoke member being equipped with a roller 29 similar to the roller 20; and the gear 26 meshes with a gear 30 on the driven shaft 9. The gears 23, 26 and 30, when in mesh, constitute one of the change speed geared connections between the supplemental and driven shafts. The gear 26 is normally held out of mesh with the gears 30 principally by gravity. It might be stated at this point that in all of the shiftable geared connections heretofore referred to, or which may hereafter be referred to, the shiftable gear remains in constant mesh with one of the fixed gears, so that when moving it into position to make a geared connection, it is only necessary to make a connection with one of said gears.

The gear 24 meshes with a gear 31, which is carried by a yoke member 32, pivoted at 33. The pivot for the yoke members 32 and 27 is in the form of a rod 34 mounted between lugs 35 secured to one of the walls of the casing. This construction is best shown in Fig. 2. The gear 31 is adapted to mesh with a gear 36 keyed, or otherwise secured, to the driven shaft 9. The gears 24, 31 and 36 constitute a second geared change speed connection, the speed ratio of which is different from that of the gears 21, 26 and 30. The yoke member 32 is provided, at its outer end, with a roller 37 similar to the other rollers heretofore described.

The gear 31, like the gear 26, is normally held out of mesh by the action of gravity; and a suitable form of stop member may be provided to limit the downward movement of the yoke members carrying these gears, so that when the gears are out of mesh, the rollers will lie always in the same plane.

As heretofore stated, there is a gear 25 secured to the supplemental shaft. This gear meshes with a gear 37 which is loose upon the driven shaft 9. The gears 25 and 37 are constantly in mesh and connection therebetween is never broken; but the gear 37, being loose upon the shaft 9, there is never any movement imparted to said shaft by the actuation of said gear, save at certain periods of operation; and to impart a movement to the shaft 9 by means of these gears, a clutch 38, which is keyed, or otherwise secured, to the shaft 9, must first be shifted so as to, by means of a clutch connection, lock the gear 37 to the shaft 9. The clutch 38 is actuated by a yoke member 39, which is secured to a sleeve-like member 40 somewhat similar to the member 13. The member 40, however, is not equipped with a cammed surface similar to the cam surface 15, because there is no intermediate gear which has to be operated by the movements of this sleeve-like member. The member 40 is actuated through the movements of a bell-crank lever 41, which is pivoted to a suitable support 42 and equipped with a roller 43. And the member 13 is actuated by a bell-crank lever 44 secured to a support 45, which is equipped with a roller 46. It will be noted in this respect that the lever 44, although lying adjacent to the sleeve-like member 40, operates the sleeve-like member 13, and that the lever 41, although adjacent the member 13, operates the member 40. This arrangement is necessitated by this reason: The members 40 and 13, as shown, travel upon the rod 14, and hence move with a rectilinear sliding movement, whereas, the levers 41 and 44, being of a bell-crank nature, swing around a pivot and hence operate with a swinging movement. If the levers adjacent the members were secured thereto, there would have to be some sort of a slip connection between them to permit the swinging movement of the levers to be converted into the rectilinear movement of the slidable members; but, by the arrangement shown, there is a double pivotal point provided for the connections between the levers and the members 13 and 40, which connections, in the form shown, are in the shape of links 47 and 48, so that the swinging movement of the levers will impart a rectilinear movement to the sliding members without any binding action as a result thereof, or without any lost motion action to accommodate the change in the class of movements.

As shown in the drawings, the link 47 connects the lever 44 and the member 13, and the link 48 connects the lever 41 and the member 40. From a study of Fig. 3, it will be seen that these links are lying slightly out of alinement with one another. This is more, however, for the purpose of clearness in illustration, and is not essential in the construction.

The member which imparts movement to all of the yoke members, clutches, and the bell-crank levers, is in the form of a shoe 49, best shown in Fig. 3, which, in the form shown, is provided with cammed grooves 50, which are arranged to contact the various rollers or contacts heretofore described. This shoe 49 travels upon guide rods 51 and 52 secured in the walls of the casing, and it is operated by any suitable form of lever mechanism, the form shown in the present case consisting of a link 53 connected to a swinging lever 54, which is provided with a suitable locking device enabling it to engage the notches 55 in a segmental rack 56. This, however, is understood to be only one method of actuating the shoe.

The operation of the device is as follows: When it is desired to obtain a direct drive, the shoe is placed by a suitable manipulation of the lever into the position shown in Fig. 3, in which position the slidable member 13 will be moved so that the yoke 11 will shift the clutch $9^a$ into position to couple or lock the driving and driven shafts together. As will be seen from a study of Fig. 3, when the member 13 is in this position, the cam 15 will act on the roller 20 of the swinging arm 18 and raise the gear 17, so that it will be out of mesh with the gear 16, and the connection between the driving shaft and the supplemental shaft broken. The two actions, the clutching of the driven and driving shafts together, and the breaking of the geared connection between the driving shaft and the supplemental shaft, are practically simultaneous and one cannot be performed without the other. With the parts in this position, a direct drive is obtained.

When it is desired to change the speed of rotation of the driven shaft, the shoe 49 is moved into position so that the cam trackway therein will engage one of the rollers on one of the swinging members 32 or 27 which carry the intermediate gears of the change speed geared connections between the supplemental shaft and the driven shaft. The engagement of a selected one of these rollers by the cam will move the shiftable gear of one of the change speed connections so as to make a connection of that particular chain of gears with the driven shaft. The shoe can be moved to bring either the gears 24, 31 and 36 into mesh with one another, or the gears 23, 26 and 30 into mesh, depending upon which speed it is deemed desirable to impart to the driven shaft. It is understood that whenever these change speed connections are effected, the shiftable gear connection between the driving shaft and the supplemental shaft is always in mesh, so that the power is being delivered from the driving shaft onto the supplemental shaft, and then through the medium of the change speed geared connection to the driven shaft.

When it is desired to drive the driven shaft in a reverse direction, the shoe is moved so as to be brought into engagement with the roller 43, rocking the bell-crank lever 41; and through the medium of the link 48 shifting the slidable member 40 to throw the clutch 38 into engagement with the gear 37, thus locking this gear to the driven shaft. The gear 37, of course, is in mesh with the gear 25, but since there is no intermediate geared connection between these two shafts, the driving shaft 9 will be driven in a reverse direction from the supplemental shaft, and the supplemental shaft is, through the medium of its geared connection with the driven shaft, being rotated in the same direction as the driving shaft. Thus, the shaft 9 will be rotated in a reverse direction from the shaft 8 and a reverse drive of the driven shaft will be effected. While this reverse drive is maintained, the shiftable gear connection between the driven shaft and the supplemental shaft is, of course, maintained. As shown in the drawings, there are a series of springs 57, which are for the purpose of assisting the return of the swinging members carrying the shiftable gears to normal position. There are also shown a series of combined stop and guide members 58, which are so positioned with respect to the various swinging members that they check the downward movement of them so as to bring the contact members to a stop in a plane which will be in line with the cam-trackway in the shoe. The stop members are in the nature of an upright bar or post which is forked at its upper end so that these members lie within the opening and are held against sidewise play when they are thrown into normal position.

The specification describes a mechanism for automatically breaking the connection between the driving and supplemental shafts when a direct drive is given to the driving shaft. As stated, this is a desirable feature because the power necessary to rotate the supplemental shaft is eliminated, and this otherwise waste power is imparted to the driving shaft, thus increasing the driving power thereof; but the breaking of this connection is not absolutely essential and can be dispensed with so far as the operation of the device is concerned. An engagement between the driving shaft and the supplemental shaft is, however, essential when the change speed or reverse drives are made; and hence this connection must be made at all times save when the direct drive is effected and may be made even then, if desired.

In moving the shoe so as to change from a direct drive to a reverse drive or vice versa, the shoe will bring into engagement during its movement to effect such change, the intermediate gears, and impart momentary variable speeds to the driven shaft. By this arrangement the shock which would be occasioned by a swift and direct change from the direct drive to the reverse drive will be eliminated, and the shaft will be graduated in its movements from one speed to another, so that when the final change takes place, the shaft will have been gradually speeded up to receive the change and the shock of the sudden change eliminated.

I claim:

1. In a change speed mechanism, the combination of a drive shaft, a driven shaft, a supplemental shaft, a series of gears on the supplemental shaft positively locked thereto, a series of gears on the driven shaft opposed to the gears on the supplemental shaft, at least one series of gears being stepped, means for connecting the drive and driven shafts together, a gear connection between the drive and supplemental shafts, including a shiftable gear, means for disconnecting the drive and driven shafts when the gear connection between the drive and supplemental shafts is made, a shiftable gear for each set of opposed gears of the series of gears, means for throwing any desired shiftable gear into position to effect a connection between its opposed gears, a reverse drive gear connection between the supplemental and driven shafts, and all of said gears being held against sliding movement, substantially as described.

2. In a change speed mechanism, the combination of a drive shaft, a driven shaft, a supplemental shaft, a gear connection between the drive and supplemental shafts, including an intermediate shiftable gear, a series of gears on the driven shaft, a series of gears on the supplemental shaft, the gears of said series being opposed and the gears of at least one series being stepped, an intermediate shiftable gear for each set of opposed gears, means for throwing any desired shiftable gear into position to effect a connection between its opposed gears, all of the gears being held against sliding movement, and all of the gears on the supplemental shaft being positively locked thereto, substantially as described.

3. In a change speed mechanism, the combination of a drive shaft, a driven shaft, a supplemental shaft, a gear connection between the drive and supplemental shafts, including an intermediate shiftable gear, a series of gears on the driven shaft, a series of gears on the supplemental shaft, the gears of said series being opposed and the gears of at least one series being stepped, an intermediate shiftable gear for each set of opposed gears, means for throwing any desired shiftable gear into position to effect a connection between its opposed gears, all of the gears being held against sliding movement, and all of the gears on the supplemental shaft being positively locked thereto, means for connecting the drive and driven shafts together, and means for breaking the connection between the drive and supplemental shafts when the connection between the drive and driven shafts is made, substantially as described.

4. In a change speed mechanism, the combination of a drive shaft, a driven shaft, a supplemental shaft, a series of gears on the supplemental shaft positively locked thereto, a series of gears on the driven shaft opposed to the gears on the supplemental shaft, at least one series of gears being stepped, means for connecting the driving and driven shafts together, a gear connection between the drive and supplemental shafts, including a shiftable gear, means for disconnecting the drive and driven shafts when the gear connection between the drive and supplemental shafts is made, a shiftable gear for each set of opposed gears of the series of gears, means for throwing any desired shiftable gear into position to effect a connection between its opposed gears, a reverse drive gear connection between the supplemental and driven shafts, all of said gears being held against sliding movement, and a single shiftable member for moving all of the connecting mechanisms and shiftable gears, substantially as described.

5. In a change speed mechanism, the combination of a drive shaft, a driven shaft, a supplemental shaft, a gear connection between the drive and supplemental shafts, including an intermediate shiftable gear, a series of gears on the driven shaft, a series of gears on the supplemental shaft, the gears of said series being opposed and the gears of at least one series being stepped, an intermediate shiftable gear for each set of opposed gears, means for throwing any desired shiftable gear into position to effect a connection between its opposed gears, all of the gears being held against sliding movement, and all of the gears on the supplemental shaft being positively locked thereto, and a single shiftable member for moving the shiftable gears, substantially as described.

6. In a change speed mechanism, the combination of a drive shaft, a driven shaft, a supplemental shaft, a gear connection between the drive and supplemental shafts, including an intermediate shiftable gear, a series of gears on the driven shaft, a series of gears on the supplemental shaft, the gears of said series being opposed and the gears of at least one series being stepped, an intermediate shiftable gear for each set of opposed gears, means for throwing any desired shiftable gear into position to effect a connection between its opposed gears, all of the gears being held against sliding movement, and all of the gears on the supplemental shaft being positively locked thereto, means for connecting the drive and driven shafts together, means for breaking the connection between the drive and supplemental shafts when the connection between the drive and driven shafts is made, and a single shiftable member for moving all of the connecting mechanisms and shiftable gears, substantially as described.

7. In a change speed mechanism, the combination of a drive shaft, a supplemental shaft, a driven shaft, a gear connection between the drive and supplemental shafts, a series of gear connections between the driven and supplemental shafts, each including a shiftable gear, all of said gears being held against sliding movement, and a slidable shoe provided with a cam face for actuating said shiftable gears, substantially as described.

8. In a change speed mechanism, the combination of a drive shaft, a driven shaft, a supplemental shaft, a gear connection between said drive and supplemental shafts, including a shiftable gear, a series of gears on the driven shaft, a series of gears on the supplemental shaft, the gears of said series being opposed and of different sizes, a shiftable gear for each set of opposed gears, means for effecting a reverse drive gear connection between said drive and driven shafts, means for effecting a direct drive of the driven member, all of the gears being held against sliding movement, and all of the gears on the supplemental shaft being fixedly keyed thereto, and a slidable shoe provided with a cam face for making or breaking any selected connection, substantially as described.

9. In a change speed mechanism, the combination of a drive shaft, a driven shaft, a supplemental shaft, a gear connection between said drive and supplemental shafts, including a shiftable gear, means for clutching the drive and driven shafts, means for moving said shiftable gear out of operative position when said clutching is effected, a series of opposed gears on the driven and supplemental shafts, said gears being of various sizes, a shiftable gear for each set of opposed gears, a reverse drive gear connection between said shafts, clutch mechanism for engaging the same, a slidable shoe provided with a cam face for actuating said shiftable gears and clutch mechanisms, all of the gears being held against rotation, and all of the gears on the supplemental shaft being fixedly keyed thereto, substantially as described.

10. In a change speed mechanism, the combination of a drive shaft, a driven shaft, a supplemental shaft, a gear connection between the drive and supplemental shafts, including a shiftable gear, a series of opposed gears on the supplemental and driven shafts, said gears being of different sizes, a shiftable gear for each set of opposed gears, all of said gears being held against sliding movement, and all of said gears on the supplemental shaft being fixedly keyed thereto, means for simultaneously effecting a clutching of the drive and driven shafts and breaking the gear connection between the drive and supplemental shafts, and a slidable shoe provided with a cam face for moving the shiftable gears and effecting the clutching operations, substantially as described.

11. In a change speed mechanism, the combination of a drive shaft, a driven shaft, a supplemental shaft, a gear connection between the supplemental and driving shafts, including a gear mounted on a swinging member, a series of opposed gears on the driven and supplemental shafts, said gears being of different sizes, a gear mounted on a swinging member and forming an intermediate gear for the opposed gears, one of said swinging gears being provided for each set of opposed gears, a gear loose on the driven shaft, a gear meshing therewith fixed on the supplemental shaft, mechanism for clutching the loose gear to the driven shaft to effect a reverse drive thereof, mechanism for clutching the driving and driven shafts together, all of said gears being held against sliding movement, and all of the gears on the supplemental shaft being fixedly keyed thereto, and means for actuating the swinging gears and clutch mechanisms, substantially as described.

12. In a change speed mechanism, the combination of a drive shaft, a driven shaft, a supplemental shaft, a gear connection between the supplemental and driving shafts, including a gear mounted on a swinging member, a series of opposed gears on the driven and supplemental shafts, said gears being of different sizes, a series of gears each mounted on a swinging member, one of said gears being provided for each set of opposed gears and constituting an intermittent gear, a gear loose on the driven shaft, a gear meshing therewith fixed on the supplemental shaft, mechanism for clutching the loose gear to the driven shaft to effect a reverse drive thereof, mechanism for clutching the driving and driven shafts together, all of said gears being held against sliding movement, and all of said gears on the supplemental shaft being fixedly keyed thereto, and a single shiftable member for actuating the shiftable gears and clutch mechanisms, substantially as described.

13. In a change speed mechanism, the combination of a drive shaft, a driven shaft, clutch mechanism for connecting said shafts, a supplemental shaft, a gear connection between said driving and supplemental shafts, including an intermediate swinging gear, a connection between the clutch mechanism and the intermediate gear, whereby said gear is thrown in mesh when said clutch connection is broken, and thrown out of mesh when said connection is made, a series of opposed gears on the supplemental and driven shafts, said gears being of different sizes, a swinging gear for each set of opposed gears, a reverse drive gear connection between said driven and supplemental shafts, all of said gears being held against sliding movement, and all of said gears on the supplemental shaft being fixedly keyed thereto, and means for actuating said swinging gears and clutch mechanisms, substantially as described.

14. In a change speed mechanism, the combination of a drive shaft, a driven shaft, clutch mechanism for connecting said shafts, a supplemental shaft, a gear connection between said driving and supplemental shafts, including an intermediate swinging gear, a connection between the clutch mechanism and the intermediate gear, whereby said intermediate gear is thrown in mesh when said clutch connection is broken and thrown out of mesh when said clutch connection is made, a series of opposed gears on the supplemental and driven shafts, said gears being of different sizes, a swinging gear for each set of opposed gears, all of said gears being held against sliding movement, and all of the gears on the supplemental shaft being rigidly keyed thereto, and a single shiftable member for actuating the swinging gears and clutch mechanisms, substantially as described.

15. In a change speed mechanism, the combination of a drive shaft, a driven shaft, clutch mechanism for connecting said shafts, a slidable member, terminating in a yoke adapted to engage the movable portion of the clutch mechanism, a supplemental shaft, a gear connection between the supplemental and driving shafts, including an intermediate gear, a swinging mounting for said gear having a contact thereon, said sliding member having a cam surface adapted to engage said contact, a series of opposed gears on the driven and supplemental shafts, said gears being of different sizes, a swinging gear for each set of opposed gears, and means for swinging said gears and actuating said slidable member, substantially as described.

16. In a change speed mechanism, the combination of a drive shaft, a driven shaft, a clutch mechanism for connecting said shafts, a slidable member, terminating in a yoke adapted to engage the movable portion of the clutch mechanism, a supplemental shaft, a gear connection between the supplemental and driving shafts, including an intermediate gear, a swinging mounting for said gear having a contact thereon, said sliding member having a cam surface adapted to engage said contact, a series of opposed gears on the driven and supplemental shafts, said gears being of different sizes, a swinging gear for each set of opposed gears, and a single shiftable member for swinging said gears and actuating said slidable member, substantially as described.

17. In a change speed mechanism, the combination of a drive shaft, a driven shaft, clutch mechanism for connecting said shafts, a slidable member carrying a yoke adapted to engage the movable portion of the clutch mechanism, a bell-crank lever for actuating the slidable member, a supplemental shaft, a gear connection between the supplemental and driving shafts, including an intermediate gear, a swinging mounting for said gear, having a contact thereon, said sliding member having a cam surface adapted to engage said contact, a series of opposed gears on the driven and supplemental shafts, an intermediate swinging gear for each set of opposed gears, and means for swinging said gears and actuating said bell-crank lever, substantially as described.

18. In a change speed mechanism, the combination of a drive shaft, a driven shaft, clutch mechanism for connecting said shafts, a supplemental shaft, a gear connection between the supplemental and driving shafts, a reverse drive gear connection between the driven and supplemental shafts, including a gear loose upon the driven shaft, a clutch for engaging said gear with the driven shaft, a slidable member having a yoke adapted to engage with the movable portion of said clutch mechanism, and means for actuating the mechanism to form and break the foregoing connections, substantially as described.

19. In a change speed mechanism, the combination of a drive shaft, a driven shaft, a supplemental shaft, a gear connection between the supplemental and driving shafts, including a gear mounted on a swinging member, a series of opposed gears on the supplemental and driven shafts, said gears being of different sizes, a gear mounted on a swinging member interposed between each set of opposed gears, a gear loose on the driven shaft, a gear meshing therewith fixed on the supplemental shaft, mechanism for clutching the loose gear to the driven shaft to effect a reverse driving movement thereof, means for clutching the driven and driving shafts, all of said gears being held against sliding movement, and a slidable shoe provided with a cam face for swinging said gears and actuating said clutch mechanisms, substantially as described.

20. In a change speed mechanism, the combination of a drive shaft, a driven shaft, clutch mechanism for connecting said shafts, a supplemental shaft, a gear connection between said driving and supplemental shafts, including an intermediate shiftable gear, means for actuating said clutch mechanism, a connection between the clutch mechanism and the intermediate gear, whereby said gear is thrown in mesh simultaneously with the breaking of said clutch connection, and thrown out of mesh simultaneously with the making of said connection, a series of opposed gears on the driven and supplemental shafts, said gears being of different sizes, a shiftable gear for each set of opposed gears, a reverse drive gear connection between said driven and supplemental shafts, all of said gears being held against slidable movement, all of said gears on the supplemental shaft being fixedly keyed thereto, and all of said shiftable gears and clutch mechanisms being provided with contact members, and a slidable shoe provided with a cam face adapted to engage said contacts to move the shiftable gears or actuate the clutch mechanisms, substantially as described.

21. In a change speed mechanism, the combination of a drive shaft, a driven shaft, clutch mechanism for joining said shafts, a slidable member carrying a yoke adapted to engage the movable portion of said clutch mechanism, a supplemental shaft, a gear connection between the supplemental and driving shafts, including an intermediate gear, a swinging mounting carrying said gear and having a contact thereon, said slidable member having a cam surface adapted to engage said contact, a series of opposed gears on the driven and supplemental shafts, said gears being of different sizes, a shiftable gear for each set of opposed gears, said slidable member and shiftable gears each being provided with contact members, a slidable shoe provided with a cam face for engaging said contacts, substantially as described.

22. In a change speed mechanism, the combination of a driving shaft, a driven shaft, clutch mechanism for joining said shafts, a supplemental shaft, a gear connection between the supplemental and driving shafts, including a shiftable gear, a reverse drive gear connection between the driven and supplemental shafts, including a gear loose upon the driven shaft, mechanism for clutching said gear with the driven shaft, a slidable member provided with a yoke adapted to engage the movable portion of said latter clutch mechanism, all of said clutch mechanism and shiftable gears being provided with contact members, and a slidable shoe provided with a cam face for engaging said contacts, substantially as described.

ROBT. MILNE.

Witnesses:
WM. P. BOND,
EPHRAIM BANNING.

---

Copies of this patent may be obtained for five cents each, by addressing the " Commissioner of Patents, Washington, D. C."